(12) United States Patent
Terrasse et al.

(10) Patent No.: US 12,465,602 B2
(45) Date of Patent: Nov. 11, 2025

(54) USE OF AN OPIOID MOLECULE FOR TREATING DRY EYE AND EYES SUFFERING FROM ALLERGIES

(71) Applicants: H4 ORPHAN PHARMA, Dijon (FR); Gaëtan Terrasse, Dijon (FR)

(72) Inventors: Gaëtan Terrasse, Dijon (FR); Catherine Bur, Dijon (FR)

(73) Assignees: H4 ORPHAN PHARMA, Dijon (FR); Gaëtan Terrasse, Dijon (FR)

( * ) Notice: Subject to any disclaimer, the term of this patent is extended or adjusted under 35 U.S.C. 154(b) by 1009 days.

(21) Appl. No.: 17/617,246

(22) PCT Filed: Jun. 5, 2020

(86) PCT No.: PCT/EP2020/065610
§ 371 (c)(1),
(2) Date: Dec. 7, 2021

(87) PCT Pub. No.: WO2020/245345
PCT Pub. Date: Dec. 10, 2020

(65) Prior Publication Data
US 2022/0233517 A1     Jul. 28, 2022

(30) Foreign Application Priority Data
Jun. 7, 2019 (FR) ..................................... 1906077

(51) Int. Cl.
| A61P 27/02 | (2006.01) |
| A61K 31/4741 | (2006.01) |
| A61K 31/728 | (2006.01) |
| A61K 31/78 | (2006.01) |
| A61P 37/08 | (2006.01) |

(52) U.S. Cl.
CPC .......... *A61K 31/4741* (2013.01); *A61P 27/02* (2018.01)

(58) Field of Classification Search
CPC .. A61K 31/4741; A61K 31/728; A61K 31/78; A61P 27/02; A61P 37/08; Y02A 50/30
See application file for complete search history.

(56) References Cited

U.S. PATENT DOCUMENTS 5,458,879 A * 10/1995 Singh .................. A61K 9/0007
514/772.3
2012/0053199 A1    3/2012 Zughaier et al.

FOREIGN PATENT DOCUMENTS

WO      2007117704 A2    10/2007

OTHER PUBLICATIONS

Jun-Kyu Kim et al. Modification of a Crosslinked Poly(acrylic acid) Based New Dehumidifying Agent and Its Moisture Absorbing Characteristics, Macromolecular Research, vol. 17, No. 7, 544-548 (2009) (Year: 2009).*
CAS STN, Carbomer, RN 9062-04-8, entered 1984 (Year: 1984).*
International Search Report issued on Sep. 4, 2020, in corresponding International Application PCT/EP2020/065610 (with English Translation).

* cited by examiner

*Primary Examiner* — Jeffrey H Murray
*Assistant Examiner* — Kevin S Martin
(74) *Attorney, Agent, or Firm* — Maier & Maier, PLLC

(57) ABSTRACT

The use of an opioid molecule, the levorotatory and dextrorotatory enantiomers of (3S)-6,7-dimethoxy-3-[(5R)-4-methoxy-6-methyl-7,8-dihydro-5H-[1,3] dioxolo [4,5-glisoquinolin-5-yl]-3H-2-benzofuran-1-one, capable of CFTR modulation and of suppressing the degranulation of basophils and mast cells, for the treatment of dry eye and eyes suffering from allergies.

5 Claims, 9 Drawing Sheets

[Fig. 1]
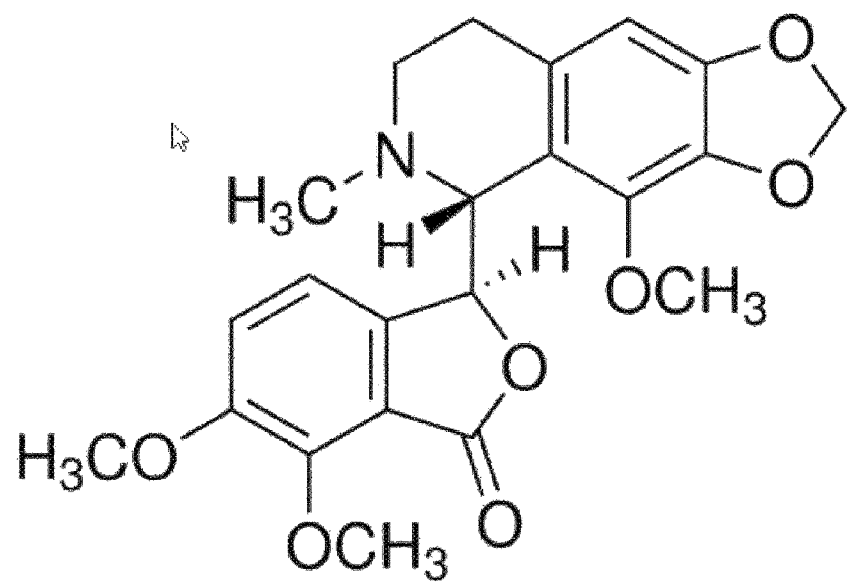

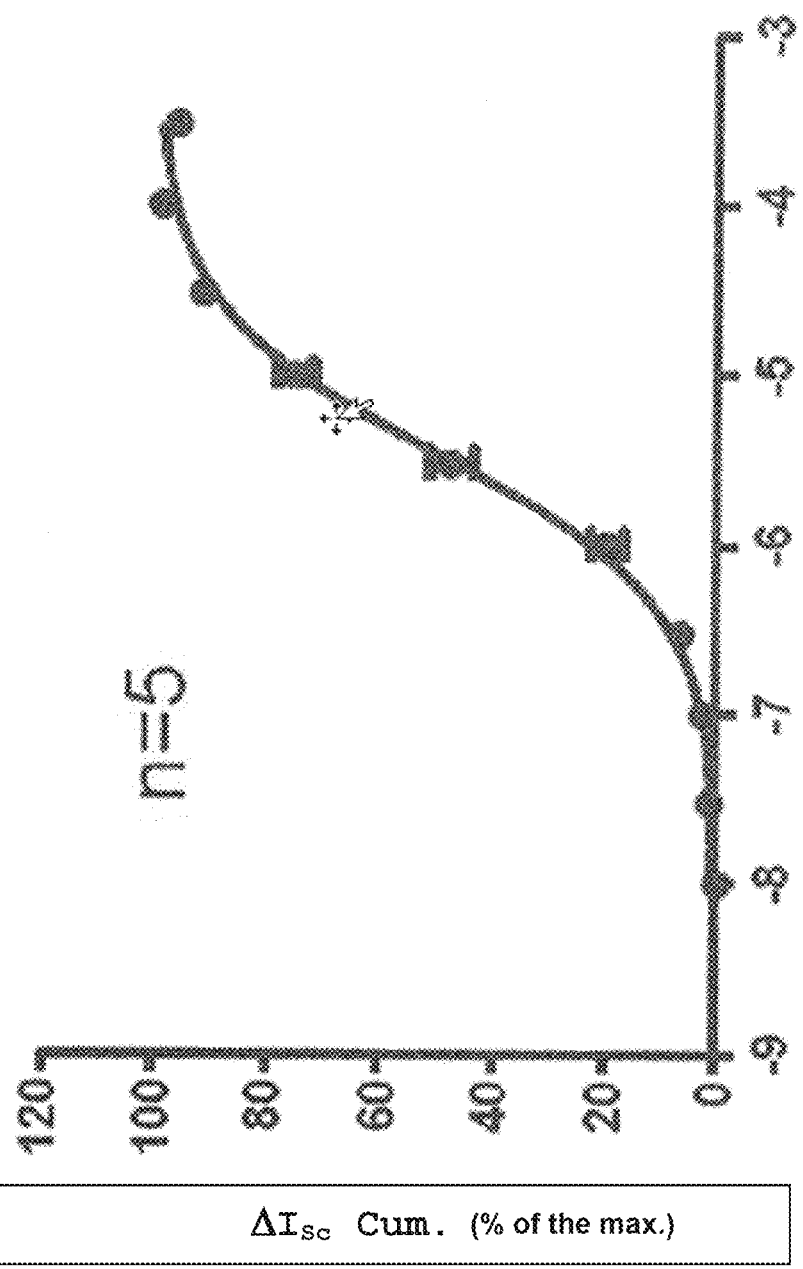
[Fig. 2]

[Fig. 3]
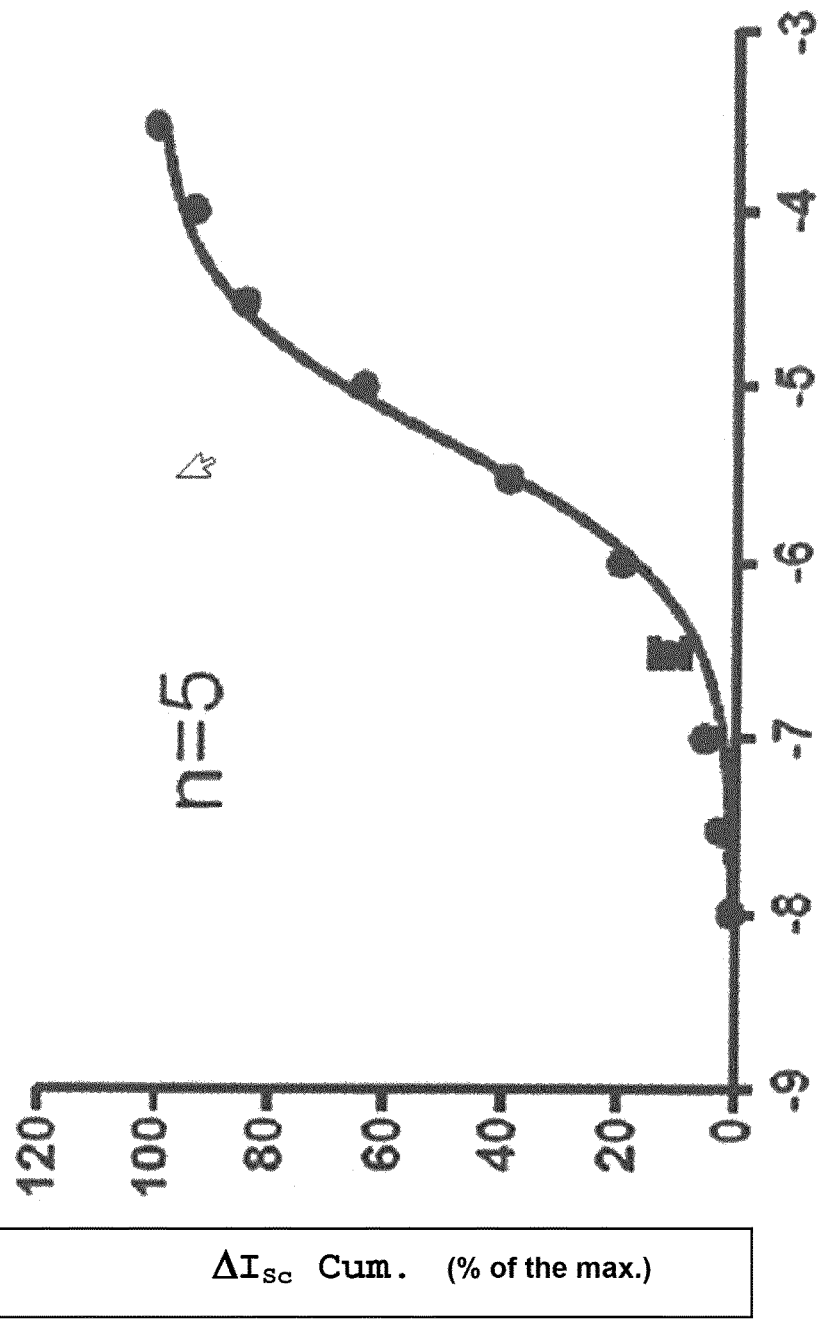

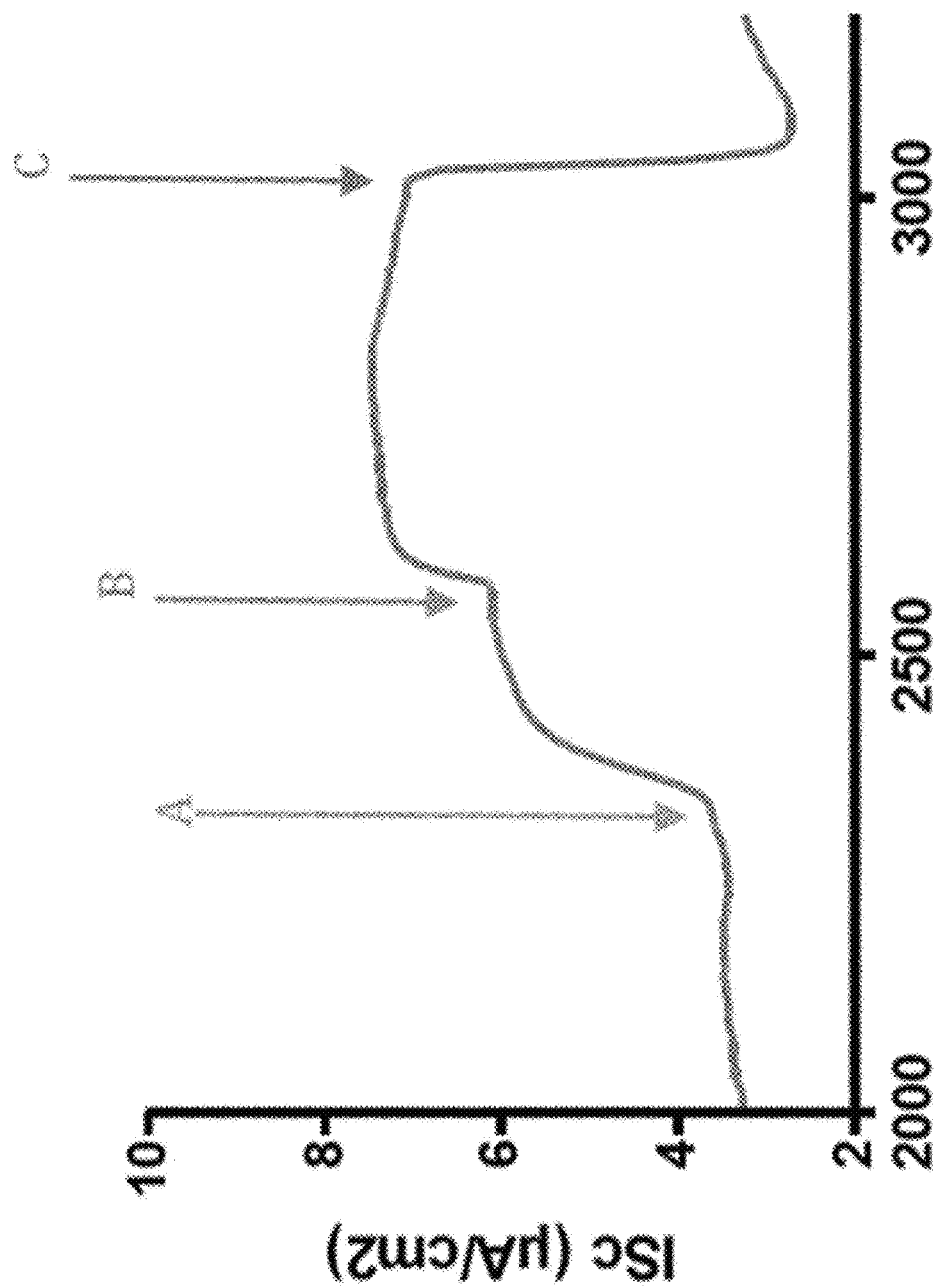
[Fig. 4]

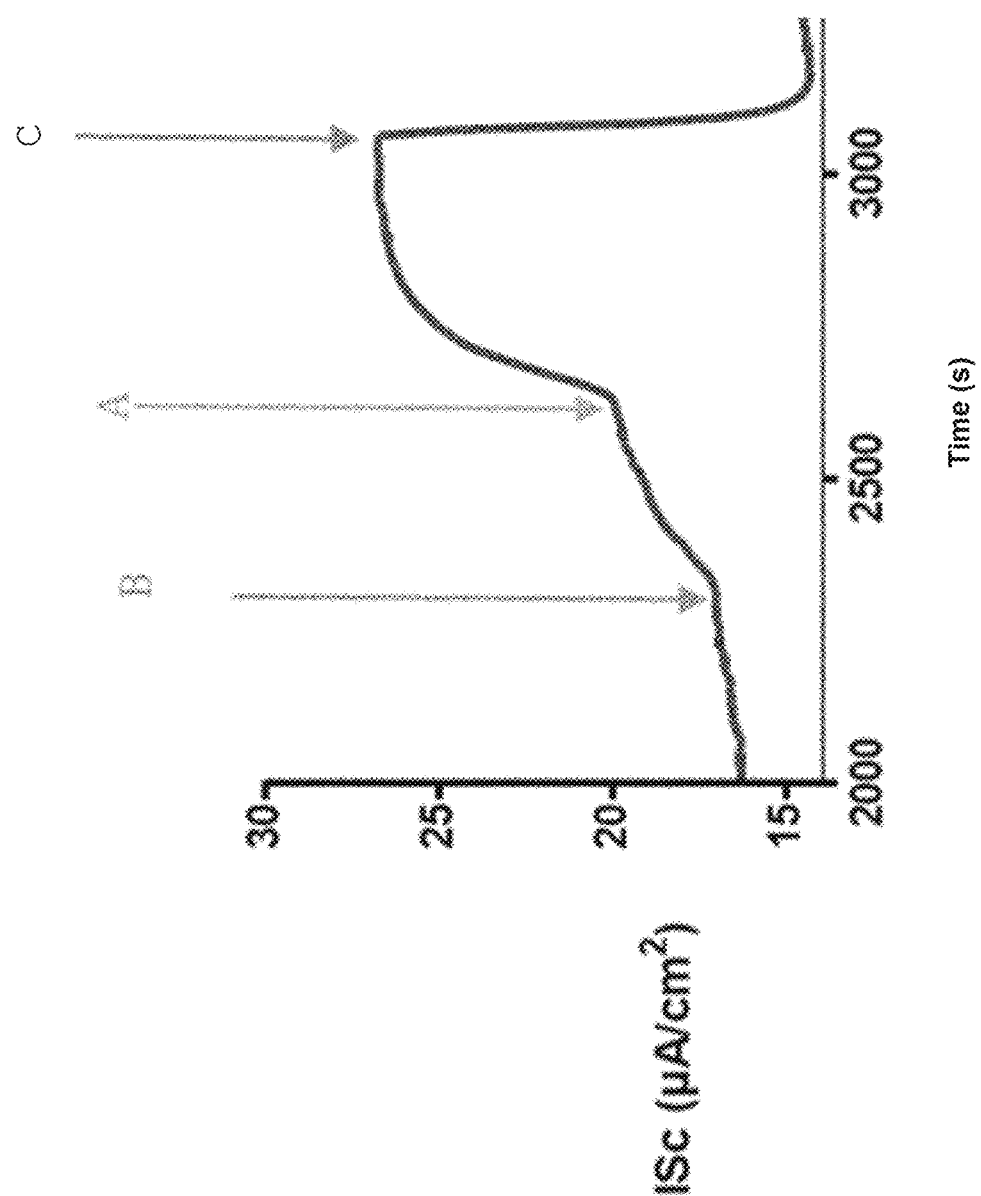
[Fig. 5]

[Fig. 6]
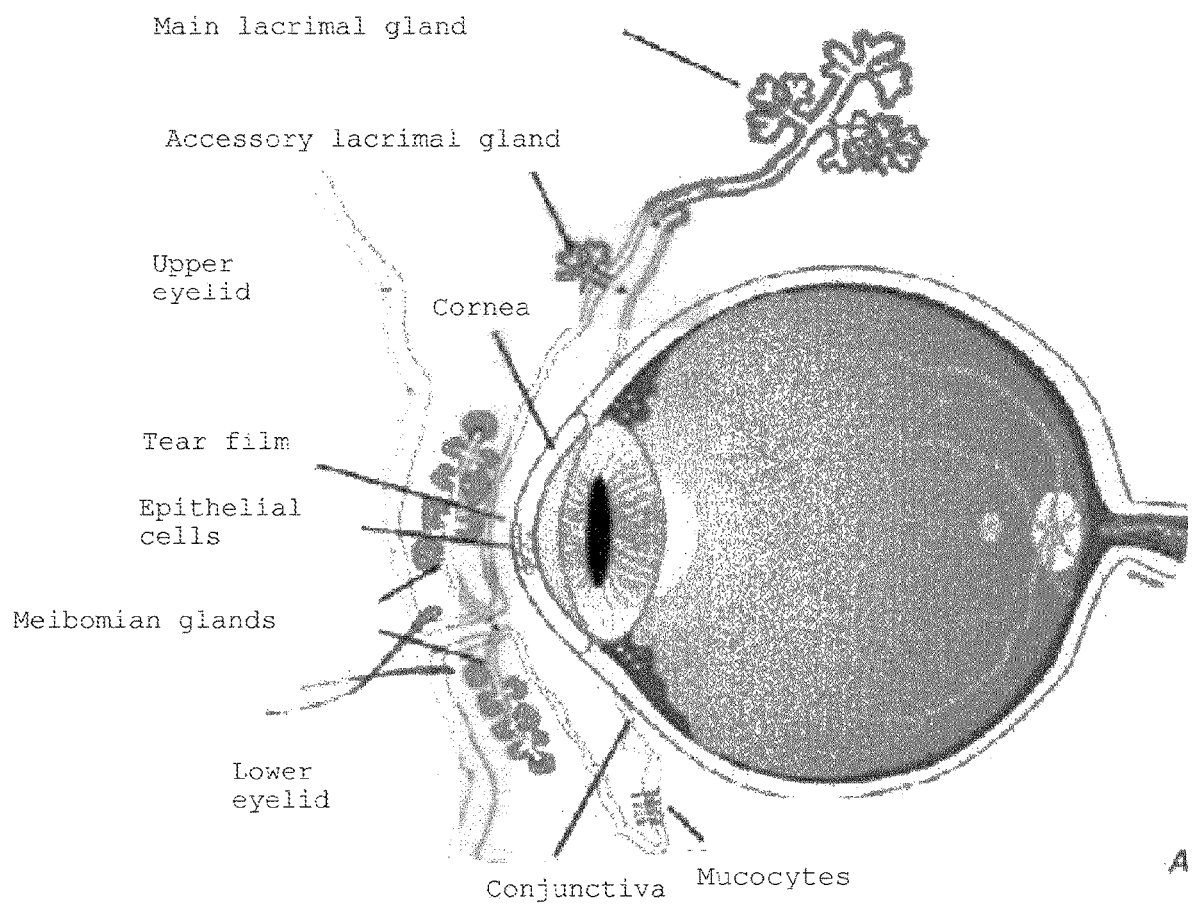

[Fig. 7]
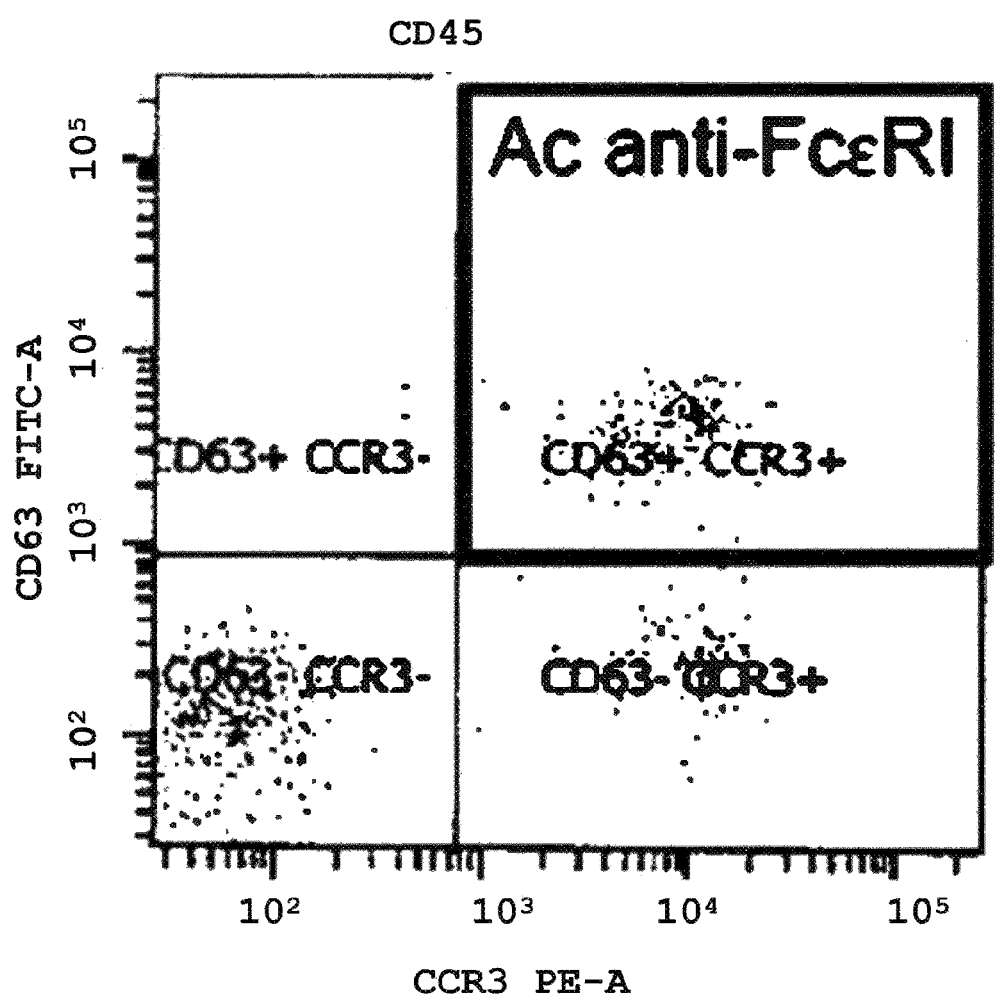

[Fig. 8]
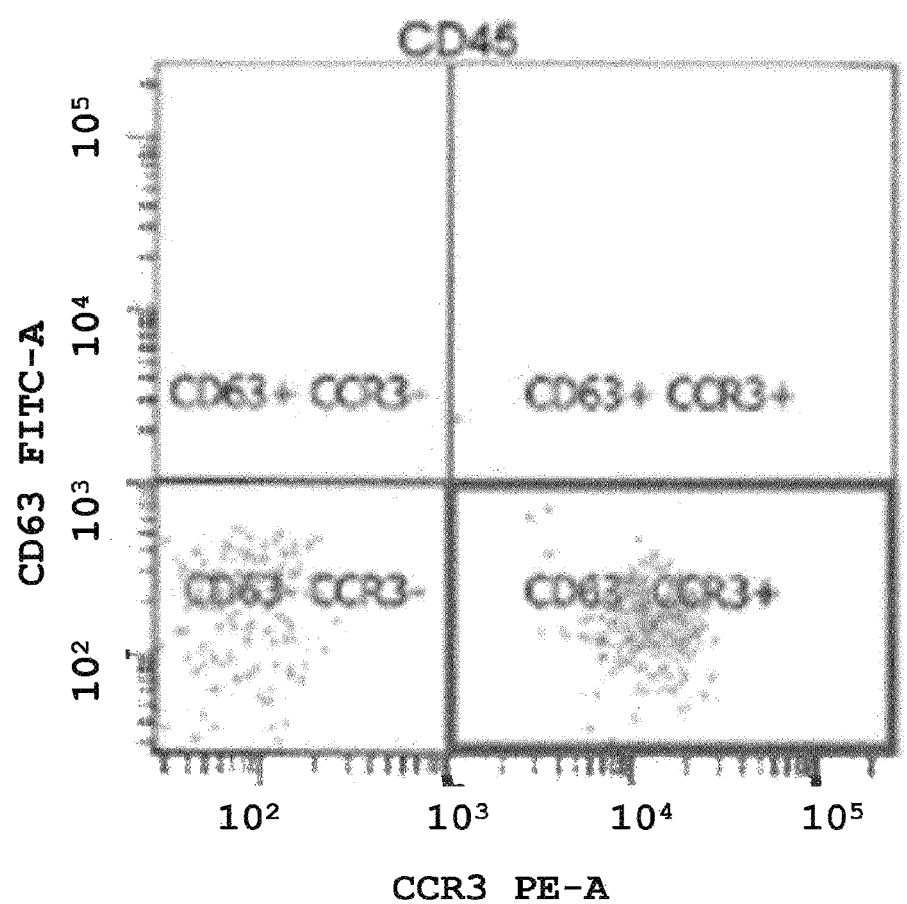

[Fig. 9]
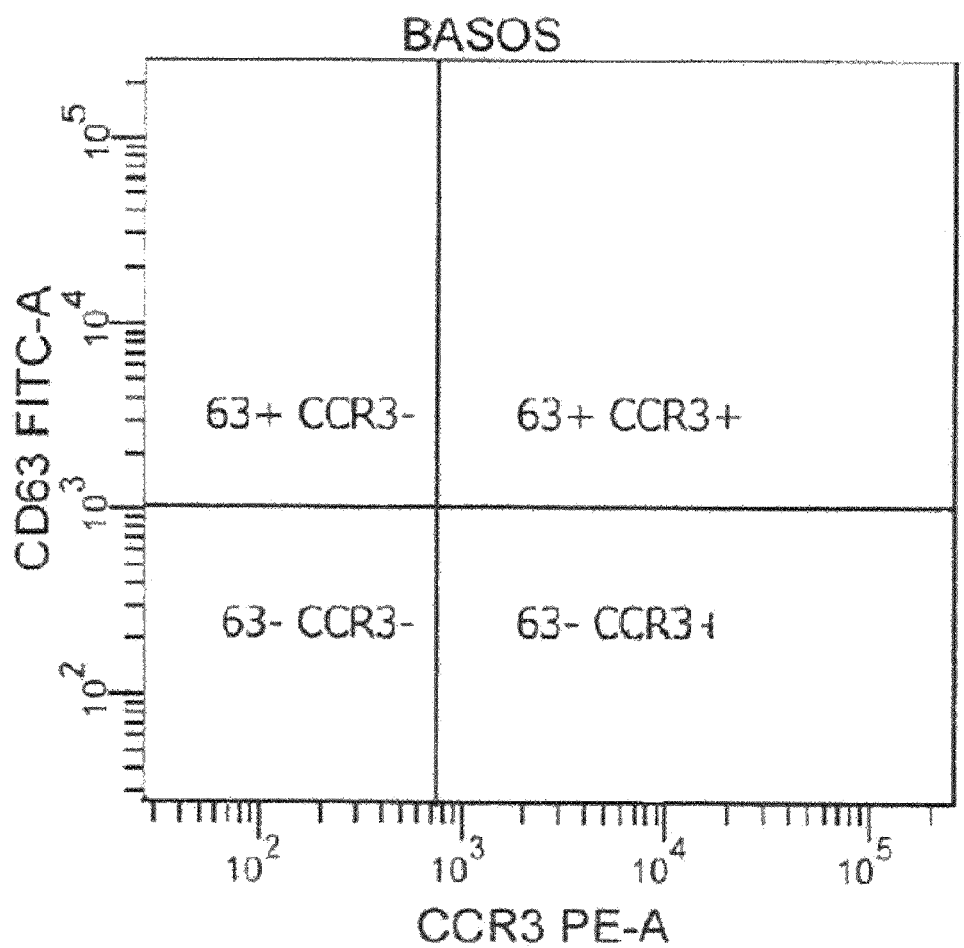

USE OF AN OPIOID MOLECULE FOR TREATING DRY EYE AND EYES SUFFERING FROM ALLERGIES

TECHNICAL FIELD

The present invention relates to the use of chemical substances: the levorotatory and dextrorotatory enantiomers of (3S)-6,7-dimethoxy-3-[(5R)-4-methoxy-6-methyl-7,8-dihydro-5H-[1,3]dioxolo[4,5-g]isoquinolin-5-yl]-3H-2-benzofuran-1-one to treat dry eye and allergic eye.

The present invention relates to the use of an opioid molecule having an activity on the modulator of the transmembrane conductance regulator (CFTR) and on the modulation of the expression of CD63 for the treatment of dry eye, and of allergic eye as well as pharmaceutical compositions, and treatment methods.

BACKGROUND

Ocular dryness or dry eye syndrome is defined by the 2007 Dry Eye Workshop as a multifactorial disease of tears and of the ocular surface resulting in symptoms of discomfort, visual disturbance and tear film instability with potential lesions of the ocular surface. It is accompanied with an increase in the osmolarity of the tear film and with an inflammation of the ocular surface. The etiologies are multiple, and a conventional distinction is made between dry syndromes by decreased tear flow (such as Gougerot-Sjogren syndrome) and dry syndromes by hyper evaporation of tears.

Meibomian gland dysfunction (MGD) is the most frequent cause of Dry Eye Disease (DED). A 2011 workshop also defined the Meibomian gland dysfunction. An inflammation of the eyelids, a microbial growth, associated skin disorders as well as potentially serious corneal complications, result in MGD becoming a complex multifactorial disorder. MGD is likely to be a heterogeneous affection resulting from the combination of the following five distinct pathophysiological mechanisms: inflammation of the eyelids, inflammation of the conjunctiva, corneal lesions, microbiological changes and DED resulting from tear film instability. The pathogenesis of both MGD and DED can be described as a "vicious cycle": the underlying pathophysiological mechanisms of DED and MGD interact, resulting in a double vicious circle. It is this double vicious circle that is at the origin of dry eye and the difficulty in treating it.

Ocular dryness (Dry Eye Disease or DED) is a multifactorial and complex disease of the ocular surface that results in a loss of tear film homeostasis and results in variable ocular symptoms. The negative effect of DED on the visual function, the quality of life and the economic burden is well recognised. (*Efficacy of topical ophthalmic drugs in the treatment of dry eye disease: A systematic literature review.* Holland E J, et al. Ocul Surf. 2019). In many patients, the disease is chronic and requires a long-term treatment.

The prevalence of DED is high, with global estimates ranging from 5 to 50% of the adult population, and the economic burden of the disease is expected to increase with the age of the population. Throughout the world, ocular lubricants are often used in the initial management of DED, but do not address the underlying causes of the disease. Potentially more effective ophthalmic pharmacological drugs targeting different distinct pathophysiologic routes of DED have been studied over the last two decades, but these efforts have resulted in the approval of very few new drugs. The main approved treatments include the 0.05% Cyclosporin A ophthalmic emulsion (Restasis®; Allergan, Irvine, CA, USA) and the lifitegrast 5.0% ophthalmic solution (Xiidra®; Shire, Lexington, United-States) in North America, cationic emulsion.; Ikervis®; Santen Pharmaceutical, Osaka, Japan) in Europe and the 3% diquafosol ophthalmic solution (Diquas®; Santen Pharmaceutical, Osaka, Japan) and a unit dose of 2% rebamipid ophthalmic suspension (Mucosta®; Otsuka Pharmaceutical, Tokyo, Japan) in Asia. In the United States (August 2018), a nanomicellar formulation of Cyclosporin A 0.09% (Cequa™; Sun Pharmaceuticals, Mumbai, India) has been approved to increase tear production in patients with DED. Overall, these drugs reduce inflammation of the ocular surface or stabilise the tear film, although it is not known which drugs are best suited for patients with aqueous solution-deficient DED (ADDE) or evaporative DED. Gougerot-Sjogren syndrome (SGS) is associated with xerophthalmia due to the progressive destruction of the lacrimal glands, which might be responsible for severe keratitis. SGS is a chronic affection of autoimmune origin characterised by an inflammatory, progressive and degenerative alteration of the exocrine glands, which may be associated with a systemic pathology affecting the joints, skin, lungs, kidneys or peripheral nerves in different ways. The pathophysiology of the disease is characterised by an infiltration of the salivary and lacrimal glands by CD4+ T lymphocytes and by B lymphocytes. The local activation and the proliferation of these lymphocytes trigger the release of pro-inflammatory cytokines that maintain a chronic inflammation state, as well as the secretion of autoantibodies, ultimately leading to death by apoptosis of epithelial cells.

Seasonal and perennial allergic conjunctivitis (ocular allergies) are characterised by itchy, red, swollen, and watery eyes. The acute symptoms of allergic conjunctivitis are characterised by the clinical signs and symptoms of itchy eyes, redness and swelling. Inflammatory reactions of late-stage allergic conjunctivitis or allergy include redness, swelling of the eyelid, and tearing. Allergic conjunctivitis and rhinoconjunctivitis could also coexist with other external ocular affections and diseases such as ocular dryness or irritations caused by pollutants or other causes. This leads to a compromised tear film, which serves to protect the ocular surface from allergens. Ocular allergy is a major cause of dry eye. There are many treatments to treat allergic conjunctivitis, but none to treat dry eye caused by an allergic pathology.

The usual and initial management of dry eye syndrome, irrespective of the etiology, is based on:
  the correction of contributing factors, as much as possible (drugs, environmental factors, eyedrops containing preservatives, in particular quaternary ammoniums;
  and a replacement treatment by tear substitutes [artificial tears in eyedrops, gels, as well as medical devices of viscoelastic solutions used after failure of the 2 others].

Once started, the ocular dryness can progress despite a replacement therapy and can sustain itself according to the concept of the vicious circle of inflammation with a progressive affection of all of the tissues on the ocular surface, including the cornea. In severe forms, the ocular dryness can be responsible for a major damage to the cornea [or keratitis] which causes a series of symptoms ranging from a sensation of a foreign body at the ocular surface and of burning to a permanent pain with reduced visual acuity. The seriousness of the ocular dryness is related to the extent of the keratitis, the inflammatory component, and ocular symptoms.

It is necessary to treat several pharmacological targets to treat the causes of vicious circles responsible for dry eye. Thus, it is necessary to revive the production of tears emitted by the lacrimal glands, but also the secretion of electrolytes by the corneal epithelium.

It has been demonstrated in an article published in 2001 that CFTR has a role in electrolyte secretion in an immortalised rabbit corneal epithelial cell line (Invest Ophthalmol Vis Sci. 2001 September Activation of a CFTR-mediated chloride current in a rabbit corneal epithelial cell line. Al-Nakkash L). But also on the secretion of the lacrimal glands (Invest Ophthalmol Vis Sci. 2018 January Novel Insight Into the Role of CFTR in Lacrimal Gland Duct Function in Mice. Berczeli O.). In this article, the authors show that a CFTR modulator is capable of increasing tear secretion in mice with normal CFTR.

CFTR is a cAMP/ATP mediated anion channel that is expressed in a variety of cell types, including secretory epithelial cells, where it regulates the anionic flow across the membrane, as well as the activity of other ion channels and proteins. In epithelial cells, the normal function of CFTR is essential for maintaining electrolyte transport throughout the body, including respiratory and digestive and even ocular tissues. CFTR is composed by about 1480 amino acids forming a protein composed by a repetition of transmembrane domains, each containing six transmembrane helices and a nucleotide binding domain. The two transmembrane domains are linked by a large regulatory polar domain [R] with several phosphorylation sites that regulate the channel activity and the cell traffic.

Chloride transport occurs through the coordinated activity of ENaC and CFTR present on the apical membrane and Na+ and K+ ATPase and Cl— channels expressed on the basolateral surface of the cell. The secondary active chloride transport on the lumen side results in the accumulation of intracellular chloride, which can then passively leave the cell through the Cl— channels, which results in a transport from the basal pole to the apical pole. Thus, the water, which is probably never actively transported, is transported through the epithelia according to transepithelial osmotic gradients generated by the flow of sodium and chlorides.

There is a need to find new treatments to modulate and activate the normal CFTR function to treat the cause of dry eye which seems to impact through an insufficient CFTR function.

Allergic conjunctivitis is one of the most common allergic affections in the world. Its incidence is increasing due to climate change, pollution, increased pollen load and increased immunological sensitivity of the subject in response to these environmental changes. The pathophysiology primarily involves the activation of mast cells linked to immunoglobulin E, the release of histamine and other mediators contributing to the spread of the response involving other immune cells and subsequent inflammation.

Allergic conjunctivitis (AC) has an increasing prevalence throughout the world. Itchy eyes are the pathognomonic symptom of AC, which allows differentiating it from other ocular affections resulting from non-allergic irritations.

Seasonal allergic conjunctivitis (SAC) and perennial allergic conjunctivitis (PAC) are the most common forms of ocular allergy subgroups and are estimated to affect 15 to 25% of the American population (Ono et al., 2005, Allergic conjunctivitis: update on pathophysiology and prospects for future treatment. J Allergy Clin Immunol). In Europe, allergic conjunctivitis is rising, affecting up to 50% of the population, possibly due to the introduction of ragweed (Burbach G., et al. 2009, Ragweed sensitisation in Europe LEN study suggests increasing prevalence. Allergy). Patients with AC usually have itching, tearing, burning, vasodilation, and chemosis bilaterally. Spring keratoconjunctivitis (SKC), chronic, morbid keratoconjunctivitis is potentially threatening to vision. These different chronic allergic pathologies are often accompanied with dry eye syndrome (Villani et al., Ocular allergy dry eye, Curr Opin All CLin Immunol, 2018).

Many treatments are used, these include antihistamine eyedrops, cortisone-based eyedrops and also eyedrops based on immunosuppressants, such as cyclosporine.

No treatment specifically addresses occular allergy and its consequences such as dry eye.

It is urgent to find solutions to treat both the inflammation of the allergic eye but also its consequences.

There is a need to find new treatments to modulate and activate the CFTR function but also to prevent mast cell degranulation to treat the intrinsic cause of the disease.

SUMMARY

The present invention relates to new compounds, comprising opioid compounds and their pharmaceutically-acceptable salts.

The inventors have discovered the astonishing properties of (3S)-6,7-dimethoxy-3-[(5R)-4-methoxy-6-methyl-7,8-dihydro-5H-[1,3]dioxolo[4, 5-g]isoquinolin-5-yl]-3H-2-benzofuran-1-one, or noscapine (cf. [FIG. 1]) on the modulation of CFTR.

The invention also relates to pharmaceutical compositions comprising at least one of the compounds described in the present document and/or at least one of their pharmaceutically-acceptable salts, these compositions may further comprise at least one other active pharmaceutical ingredient and/or at least one excipient.

The invention also relates to methods of treating dry eye, allergic conjunctivitis or Gougerot-Sjogren disease, consisting in administering at least one of the compounds described herein and/or at least one of its pharmaceutically-acceptable salts, possibly as part of a pharmaceutical composition comprising at least one additional component, to a subject needing it.

Noscapine is a chemical substance that has been known for many years and is used as a cough suppressant. Noscapine is a non-narcotic isoquinoline phthalide alkaloid derived from the opium poppy, *Papaver somniferum*, with mild analgesic, cough-suppressing and antineoplastic activities. Noscapine exerts its cough-suppressing effects by activating the sigma opioid receptors. This agent seems to exert its antimitotic effect by binding to tubulin, which disrupts the dynamics of microtubule assembly and, subsequently, inhibits mitosis and tumor cell death.

Therapeutically-effective doses primarily address the undesirable effects of codeine and, except for occasional nausea, its undesirable effects are negligible. Doses up to 90 mg per day have no effect on respiration in humans.

Noscapine is a benzylisoquinoline alkaloid substituted with a 4,5-dimethoxy-3-oxo-1,3-dihydro-2-benzofuran-1-yl group in position 1, a methylenedioxy group in positions 6 and 7 and a methoxy group in position 8. Obtained from plants of the Papaveraceae family, it has no significant pain-relieving properties and is mainly used for its cough-suppressing effects. Noscapine, of molecular formula $C_{22}H_{23}NO_7$, has a molecular weight of 413. This compound can be modified or substituted with compounds comprising either carbon 14 or deuterated compounds.

Compounds and salts marked with an isotope can be used in many ways. They could be suited for drugs and/or for different types of tests, such as tissue-on-substrate distribution tests. For example, compounds marked with tritium and/or carbon-14 are particularly useful for various types of tests, such as tissue-on-substrate distribution tests, thanks to their relatively simple preparation and their excellent detectability. For example, deuterium-marked products are therapeutically-useful and have potential therapeutic advantages in comparison with compounds that are not marked with deuterium. In general, compounds and salts marked with deuterium may have higher metabolic stability than those that are not marked with isotopes thanks to the isotopic kinetic effect. A higher metabolic stability translates directly into an increased half-life in vivo or into lower doses, which might be desired. Compounds and salts marked with an isotope can generally be prepared by following the procedures described in known synthetic schemes. The associated descriptions in world literature such as the patent EP3352757. Thus, it is easy to replace non-deuterated methyls with deuterated methyls. Noscapine is in the form of a white crystalline powder. Insoluble in water; soluble in benzene and acetone. The salts formed with acids are dextrorotatory.

The inventors have demonstrated that noscapine had a very significant action on CFTR but also on the inhibition of the degranulation of the basophil, which is the cell counterpart of the mast cell. These two combined actions are essential to treat allergic eye and dry eye.

Numerous patents have been filed on noscapine, but none talks about its activity on dry eye or allergic eye.

BRIEF DESCRIPTION OF THE FIGURES

FIG. 1 represents the chemical structure of noscapine.

FIG. 2 Activity of noscapine at the apical pole expressed as a percentage of the maximum effect.

FIG. 3 Activity of noscapine at the basal pole expressed as a percentage of the maximum effect.

FIG. 4 Effect of noscapine expressed in $\mu A/Cm^2$ at the apical pole on epithelial cells of the lacrimal gland (A=Forskolin; B=Noscapine; C=Inh 172).

FIG. 5 Effect of noscapine expressed in $\mu A/Cm^2$ at the basal pole on epithelial cells of the lacrimal gland (A=Forskolin; B=Noscapine; C=Inh 172).

FIG. 6 the lacrimal functional unit according to DARTT 2002.

FIG. 7 positive control, analysis by flow cytometry demonstrating the degranulation of the basophil by the anti-FcεRI antibodies, which is the anti-receptor for IgE (CD63+ and CCR3+).

FIG. 8 negative control in flow cytometry

FIG. 9 Inhibition of basophil degranulation by noscapine (10 μM).

DETAILED DESCRIPTION

The inventors have demonstrated the astonishing and surprising properties of noscapine in a human cellular model of CFTR modulation without mutation.

Thus, the present invention relates to the use of chemical substances: the levorotatory and dextrorotatory enantiomers of (3S)-6,7-dimethoxy-3-[(5R)-4-methoxy-6-methyl-7,8-dihydro-5H-[1,3]dioxolo[4,5-g]isoquinolin-5-yl]-3H-2-benzofuran-1-one and its pharmaceutically-acceptable salts for use in the treatment of diseases associated with decreased secretions of epithelial cells of conjunctival tissue, lacrimal glands and Meibomian glands.

The present invention also relates to the levorotatory and dextrorotatory enantiomers of (3S)-6,7-dimethoxy-3-[(5R)-4-methoxy-6-methyl-7, 8-dihydro-5H-[1,3]dioxolo[4.5-g]isoquinolin-5-yl]-3H-2-benzofuran-1-one and its pharmaceutically-acceptable salts for use in the treatment of diseases associated with ocular allergy.

Thus, the present invention relates to the use of chemical substances: the levorotatory and dextrorotatory enantiomers of (3S)-6,7-dimethoxy-3-[(5R)-4-methoxy-6-methyl-7,8-dihydro-5H-[1,3]dioxolo [4,5-g]isoquinolin-5-yl]-3H-2-benzofuran-1-one and its pharmaceutically-acceptable salts for use in the treatment of dry eye disease.

Thus, the present invention relates to the use of chemical substances: the levorotatory and dextrorotatory enantiomers of (3S)-6,7-dimethoxy-3-[(5R)-4-methoxy-6-methyl-7,8-dihydro-5H-[1,3]dioxolo[4,5-g] isoquinolin-5-yl]-3H-2-benzofuran-1-one and its pharmaceutically-acceptable salts for use thereof in the treatment of dry eye disease related to Gougerot-Sjogren disease and secondary Gougerot-Sjogren syndromes which accompany autoimmune diseases such as rheumatoid polyarthritis or systemic lupus erythematosus.

Thus, the present invention relates to the use of chemical substances: the levorotatory and dextrorotatory enantiomers of (3S)-6,7-dimethoxy-3-[(5R)-4-methoxy-6-methyl-7,8-dihydro-5H-[1,3]dioxolo[4,5-g]isoquinolin-5-yl]-3H-2-benzofuran-1-one and its pharmaceutically-acceptable salts for use in the treatment of allergic conjunctivitis with decreased tear film secretion.

Thus, the present invention relates to the use of chemical substances: the levorotatory and dextrorotatory enantiomers of (3S)-6,7-dimethoxy-3-[(5R)-4-methoxy-6-methyl-7,8-dihydro-5H-[1,3]dioxolo[4,5-g]isoquinolin-5-yl]-3H-2-benzofuran-1-one and its pharmaceutically-acceptable salts for use in the treatment of vernal keratoconjunctivitis.

Thus, the present invention relates to the use of chemical substances: the levorotatory and dextrorotatory enantiomers of (3S)-6,7-dimethoxy-3-[(5R)-4-methoxy-6-methyl-7,8-dihydro-5H-[1,3]dioxolo[4,5-g] isoquinolin-5-yl]-3H-2-benzofuran-1-one and its pharmaceutically-acceptable salts for use in the treatment of dry eye disease characterised in that it is administered in the form of eyedrops or ophthalmic ointment.

Thus, the present invention relates to the use of chemical substances: the levorotatory and dextrorotatory enantiomers of (3S)-6,7-dimethoxy-3-[(5R)-4-methoxy-6-methyl-7,8-dihydro-5H-[1,3]dioxolo[4,5-g]isoquinolin-5-yl]-3H-2-benzofuran-1-one and its pharmaceutically-acceptable salts for use in the treatment dry eye disease and/or allergic eye disease characterised in that it is administered as eyedrops at a dose of 0.1 milligram to 5 milligram.

According to a preferred embodiment, the present invention relates to the use of chemical substances: the levorotatory and dextrorotatory enantiomers of (3S)-6,7-dimethoxy-3-[(5R)-4-methoxy-6-methyl-7, 8-dihydro-5H-[1,3]dioxolo [4,5-g]isoquinolin-5-yl]-3H-2-benzofuran-1-one and its pharmaceutically-acceptable salts for use in the treatment of dry eye disease characterised in that it is administered in the form of eyedrops in combination with humectants and lubricants based on hyaluronic acid or carbomers. These compounds have the capability of increasing the persistence of the noscapine effect. According to a preferred embodiment, the present invention relates to the use of chemical substances: the levorotatory and dextrorotatory enantiomers of (3S)-6,7-dimethoxy-3-[(5R)-4-methoxy-6-methyl-7, 8-dihydro-5H-[1,3]dioxolo[4,5-g]isoquinolin-5-yl]-3H-2- benzofuran-1-one and its pharmaceutically-acceptable salts for use in the treatment of dry eye disease and/or allergic eye disease characterised in that it is substituted at least at one of its methyls with deuterated methyls. The present invention also relates to the chemical substances: the levorotatory and dextrorotatory enantiomers of (3S)-6,7-dimethoxy-3-[(5R)-4-methoxy-6-methyl-7,8-dihydro-5H-[1,3]dioxolo[4,5-g]isoquinolin-5-yl]-3H-2-benzofuran-1-one and its pharmaceutically-acceptable salts for use in improving ionic transport at the apical level as well as at the basal pole of the corneal epithelial cell, the palpebral epithelial cell, the lacrimal glandular and/or Meibomian glandular epithelial cells.

According to the preferred embodiment, said chemical substance is substituted at its methyls with deuterated methyls to improve pharmacokinetics.

According to a preferred embodiment, the invention relates to the levorotatory and dextrorotatory enantiomers of (3S)-6,7-dimethoxy-3-[(5R)-4-methoxy-6-methyl-7,8-dihydro-5H-[1,3]dioxolo[4,5-g]isoquinolin-5-yl]-3H-2-benzofuran-1-one and its pharmaceutically-acceptable salts for use in the treatment of dry eye disease at the dose of 0.1 milligram to 5 milligram/day.

According to a preferred embodiment, the invention relates to the levorotatory and dextrorotatory enantiomers of (3S)-6,7-dimethoxy-3-[(5R)-4-methoxy-6-methyl-7,8-dihydro-5H-[1,3]dioxolo[4,5-g]isoquinolin-5-yl]-3H-2-benzofuran-1-one and its pharmaceutically-acceptable salts for use in the treatment of dry eye remarkable in that it is packaged in the form of eyedrops or ophthalmic ointment.

EXAMPLES

To study this action on the modulation of CFTR, the inventors have used the Ussing chamber method, invented by the Danish Hans H. Ussing at the end of the 1950s. This technique allows studying ionic exchanges through an epithelium, as they allow maintaining the tissue of interest in survival for a few hours under controlled conditions of temperature and medium. The positioning of the tissue between two half-chambers allows defining an apical compartment (corresponding to the lumen of the organ) and a basolateral compartment (corresponding to the blood compartment) and studying the exchanges between these two compartments via the tissue.

This technique is commonly used and it is particularly well-suited for a pharmacological approach of ionic transports and to search for molecules of therapeutic interest in the context of ionic secretions from epithelial cells. It consists in measuring the transepithelial current (called short-circuit and denoted Ise). Ise is expressed in amperes relative to the unit surface area of the epithelium (Ise in $\mu A/cm2$). The cells are cultured on a porous filter for 10 to 15 days at the liquid-liquid then air-liquid interface in order to mimic conditions close to in vivo. The transepithelial resistance is regularly measured during the culture. The higher this resistance (several hundred ohms), the more the epithelial tissue is contiguous, polarised and therefore tight. At the Air (apical side)—Liquid (basolateral side) interface, the epithelial cells polarise and form a tight mat that can be studied with the Ussing chamber technique. We have used a system with 6 vats from Physiologie Instrument@ enabling 6 experiments in parallel.

We have used the equipment and the following molecules in our study:

Amiloride: 100 µM final concentration; 100 mM stock solution, water solvent (supplier Sigma®).

Forskolin: 0.05 µM final concentration; 1 mM stock solution, DMSO solvent (supplier Sigma®).

Genistein: 30 µM final concentration; 30 mM stock solution, DMSO solvent (supplier Sigma®).

CFTR inh172: 10 µM final concentration; 10 mM stock solution, DMSO solvent (supplier Fisher®).

UTP: 100 µM final concentration; 100 mM stock solution, DMSO solvent (supplier Sigma®).

We have used various media and reagents including media suited for the Ussing chamber: Snapwell (Fisher®), culture medium (Gibco®), SVF (Gibco®), Puromycin (Gibco®), T75 culture flasks (Fisher®).

The inventors have used USSING chambers to analyse the activity of noscapine on the CFTR of glandular epithelial cells.

Typical protocols used for human epithelial cells expressing non-mutated CFTR:

Measurement of the short-circuit current in the presence of amiloride (inhibitor of the ENaC channel, 100 µM) then addition of 10 µM of the noscapine molecule then addition of CFTR inh172 (10 µM, CFTR inhibitor) then addition of UTP (100 µM, validates the experiment by activating the sensitive calcium Cl transport).

Measurement of the short-circuit current in the presence of amiloride (100 µM) and forskolin (0.05 µM activator of intracellular cAMP) then addition of 10 µM of the noscapine molecule then addition of CFTRinh172 (10 µM) then addition of UTP (100 µM).

Measurement of the short-circuit current in the presence of CFTR Inh172 (10 µM) then addition of noscapine and forskolin (0.05 µM) then addition of UTP.

The inventors have prepared a 100 µM stock solution in DMSO. The compounds have been aliquoted by 100 µL and stored at −20° C.

Noscapine has been added to the USSING cells at a dose of 10 µM on non-mutated cells [FIG. 5].

The effect of noscapine on non-mutated epithelial cells on the apical side is significant, because the differential switches from 16 to more than 20 (expressed in µA/cm2).

The addition of forskolin changes the potential from 20 to 27 (expressed in µA/cm2).

The addition of Inh172 completely blocks the cellular potential.

Noscapine activates the cellular potential in lacrimal gland epithelial cells expressing non-mutated CFTR. This effect adds with that of forskolin.

The effect of noscapine on non-mutated lacrimal gland epithelial cells on the apical side is significant, because the differential switches from 6.5 to more than 7.5 (expressed in µA/cm2).

The addition of forskolin changes the potential which switches from 3.5 to 6.5 (expressed in µA/cm2).

The addition of Inh172 completely blocks the cellular potential.

In conclusion, noscapine activates ion transport in the epithelial cells of the lacrimal gland.

This effect is blocked by inh172, which specifically inhibits the ionic transport of CFTR.

Noscapine appears to be a molecule capable of stimulating ionic transport via non-mutated CFTR.

We have then determined the effective dose of noscapine on both the apical pole and the basal pole.

The result gives an EC50 activity of 3.42+/−0.19 µM for the apical pole and an EC50 of 4.87+/−0.27 µM for the basal pole [FIG. 2], [FIG. 3].

Thus, noscapine allows improving the tear secretion function of patients with a confirmed pathology of dry eye, including patients with Gougerot-Sjogren disease, but also Gougerot-Sjogren so-called "secondary" because they are associated with specific autoimmune diseases such as rheumatoid polyarthritis or systemic lupus erythematosus.

To demonstrate the effect of noscapine on the allergic eye, the inventors have worked on a cellular model of allergy, the basophil. In the conjunctival mucosa, we have found mast cells but also basophils. Human mast cells and polynuclear basophils are with a relatively similar morphological aspect, derived from the same CD34+ hematopoietic stem cell.

While mast cells are elements residing in tissues, the basophil is a circulating cell, but in the event of a major allergic outbreak, it could be found in epithelial tissues (Kepley et al., J Respir Crit Care Med. 2001. Immunohistochemical detection of human basophils in post mortem cases of fatal asthma).

These two cells intervene in the IgE-dependent allergic reaction; they express the high-affinity IgE receptor. Nevertheless, the mediators released by these cells during this activation are different for some of them. Moreover, basophils and especially mast cells intervene in innate immunity. Thus, basophils and mast cells have many characteristics in common and more particularly, the secretion of IL4 and IL13 which are known to induce the stimulation of collagen synthesis and the proliferation of fibroblasts responsible for fibrosis. Fibrosis can affect the Meibomian glands in dry eye and allergic eye. Basophils are present in the circulating blood in contrast with mast cells which feature most properties. To study the action of noscapine on the basophil, we have used a commercial kit, the Flow CAST® kit from BULHMANN Laboratories AG (Switzerland) which is a basophil activation test (TAB) that can be used for the detection in vitro of the degranulation of basophils as well as for the study of immediate-type allergic reactions and hypersensitivities.

It is designed for the in vitro diagnosis of the expression of the CD63 marker as a surface marker of activated basophils. The test is carried out on whole blood; flow cytometry allows quantifying the expression of CD63 at the surface of activated basophils.

The inventors have used the CAST Kit-Flow to test the action of noscapine on the inhibition of basophil degranulation. For more information on the product, visit Buhlmann Laboratories' website. The activation (or degranulation) of basophils can be done in three different ways either by an allergen, or by an "anti-IgE" (anti-FcɛRI, which is the anti-receptor of IgE) or by a bacterial lipopolysaccharide antigen, called fMLP. At rest, basophils express very little the CD63 antigen because it is bound to intracytoplasmic granules.

The activation of basophils (eg. by an IgE (immunological activation) or fMLP (non-immunological activation)) results in the fusion of the granules with the plasma membrane and therefore the expression of CD63 at the surface of the cells.

To assess the degranulation, the Flow CAST® kit has been partially used. This test comprises an anti-IgE of the IgE receptor.

CCR3 is a protein encoded by a gene which is a receptor for C—C type chemokines. It belongs to family 1 of receptors coupled to the G protein. It is highly expressed in eosinophils, in basophils and is also detected in TH1 and TH2 cells, as well as in epithelial cells.

Flow cytometry is used to characterise the different blood cells. Laser beams allow the assessment and measurement of different cellular parameters. The frontal measurement of the diffracted light of the laser beam allows assessing the size of the cell: this is the Forward SCatter (FSC). The measurement of the light diffracted perpendicularly allows assessing the granularity of the cell: this is the Side SCatter (SSC).

This granularity may be due to irregularities inside or at the surface of the cells or to the density of the organelles that compose it (acess.ens-lyon.fr). Afterwards, fluorescence markers allow better characterising the different cell subpopulations (these markers are coupled with the differentiation clusters). The inventors have chosen a degranulation protocol. Thus, 4 patients have been chosen randomly from among patients who have undergone a conventional blood sample (NF) in a medical biology laboratory. For recall, upon the activation of the basophils, the CD63 markers bound to the intracytoplasmic granules will fuse with the plasma membrane. They are then expressed at the surface of the cell: the activated basophils therefore become CD63+. Besides CD63, another specific marker for basophils allows targeting them better: this is CCR3 (chemokine receptor 3). The latter is always expressed by this cell type. The activated and degranulated basophils are CD63+ and CCR3+; non-degranulated basophils are CD63− and CCR3+. First of all, a "negative control" sample has been defined, it is that containing only the neutral buffer. The latter has been analysed in order to observe the expected results in the absence of stimulation and therefore of degranulation. We can notice, in [FIG. 8], that only the CD63− CCR3+ area (in blue) contains a cloud of points corresponding to non-degranulated basophils.

Hence, in the absence of stimulation, the cells are not activated and do not degranulate. The positive control sample is made with the FcɛRI antibody.

A window (Positive control sample with the anti-FcɛRI Antibody) allows observing the point clouds in the CD63+ CCR3+ area (in red). The used product (anti-FcɛRI Ab) actually leads to the degranulation of Basophils (cf. [FIG. 7]).

FIG. 9 shows that noscapine blocks the activation of basophil degranulation caused by the anti-FcɛRI Antibody.

We can say that noscapine has a surprising action on the inhibition of degranulation through the stimulation of the IgE receptor.

Thus, in the dry eye, noscapine would have two actions. An action on the basophil and therefore the mast cell by preventing the degranulation thereof and another one on the CFTR. The action on degranulation preventing the inflammatory reaction and the action on the normal CFTR allows restarting the secretion of the lacrimal glands but also of the conjunctival epithelial cells. Thus, the tear film which is strongly disturbed with a great instability in the dry eye will be reconstituted.

Thus, the local action of noscapine on the dry eye seems to be remarkable and surprising by its two pharmacological actions on CFTR and the inhibition of basophil and mast cell degranulation.

The invention claimed is:

1. A method of treating dry eye disease comprising administering (3S)-6,7-dimethoxy-3-[(5R)-4-methoxy-6-methyl-7,8-dihydro-5H-[1,3] dioxolo [4,5-g] isoquinolin-5-yl]-3H-2-benzofuran-1-one, its enantiomer, or a pharmaceutically-acceptable salts thereof, to a patient in need.

2. The method according to claim 1, wherein the dry eye disease is associated with at least one condition selected from:

decreased secretions by conjunctival epithelial cells, lacrimal glands, or Meibomian glands; an ocular allergy selected from allergic conjunctivitis with decreased tear film secretion or vernal keratoconjunctivitis; or an autoimmune disease selected from rheumatoid arthritis, systemic lupus erythematosus, or Gougerot-Sjögren syndrome.

3. The method according to claim 1, wherein the (3S)-6,7-dimethoxy-3-[(5R)-4-methoxy-6-methyl-7,8-dihydro-5H-[1,3] dioxolo [4,5-g] isoquinolin-5-yl]-3H-2-benzofuran-1-one, its enantiomer, or a pharmaceutically-acceptable salt thereof is administered at a dose of 0.1 to 5 mg/day.

4. The method according to claim 1, wherein the (3S)-6,7-dimethoxy-3-[(5R)-4-methoxy-6-methyl-7,8-dihydro-5H-[1,3] dioxolo [4,5-g] isoquinolin-5-yl]-3H-2-benzofuran-1-one, its enantiomer, or a pharmaceutically-acceptable salt thereof is administered in combination with a humectants and/or a lubricants; wherein the humectant comprises carbomer, and the lubricant comprises hyaluronic acid.

5. The method according to claim 1, wherein the (3S)-6,7-dimethoxy-3-[(5R)-4-methoxy-6-methyl-7,8-dihydro-5H-[1,3] dioxolo [4,5-g] isoquinolin-5-yl]-3H-2-benzofuran-1-one, its enantiomer, or a pharmaceutically-acceptable salts thereof is packaged in a form of eyedrops or ophthalmic ointment.

* * * * *